US010421399B2

(12) United States Patent
Alarcon et al.

(10) Patent No.: US 10,421,399 B2
(45) Date of Patent: Sep. 24, 2019

(54) DRIVER ALERT SYSTEMS AND METHODS BASED ON THE PRESENCE OF CYCLISTS

(71) Applicant: GM Global Technology Operations LLC, Detroit, MI (US)

(72) Inventors: Michael D. Alarcon, Markham (CA); Brett Bullock, Newmarket (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 15/606,550

(22) Filed: May 26, 2017

(65) Prior Publication Data
US 2018/0339656 A1 Nov. 29, 2018

(51) Int. Cl.
*B60Q 1/00* (2006.01)
*B60Q 9/00* (2006.01)
*B60R 1/00* (2006.01)
*G06K 9/00* (2006.01)

(52) U.S. Cl.
CPC .............. *B60Q 9/008* (2013.01); *B60R 1/00* (2013.01); *G06K 9/00805* (2013.01); *B60R 2300/802* (2013.01); *B60R 2300/8033* (2013.01)

(58) Field of Classification Search
CPC .......... B06Q 9/008; B06Q 5/006; B60R 1/00; B60R 2300/8033; G06K 9/00805
USPC ...................................................... 340/435
See application file for complete search history.

(56) References Cited

U.S. PATENT DOCUMENTS

| 5,325,096 | A | * | 6/1994 | Pakett | G01S 13/52 342/70 |
| 8,768,566 | B2 | * | 7/2014 | Schwarzhaupt | B60Q 1/22 348/148 |
| 2013/0335212 | A1 | * | 12/2013 | Purks | B60Q 1/34 340/435 |
| 2015/0003670 | A1 | * | 1/2015 | Kuehnle | G06K 9/00805 382/103 |
| 2015/0274074 | A1 | * | 10/2015 | Petrillo | B60R 1/00 701/36 |
| 2016/0379066 | A1 | * | 12/2016 | Reiche | G06K 9/00805 348/148 |
| 2017/0076606 | A1 | * | 3/2017 | Gupta | G08G 1/167 |
| 2017/0091559 | A1 | * | 3/2017 | Hurtado | H04N 7/181 |
| 2017/0113620 | A1 | * | 4/2017 | Fritz | B60R 1/1207 |
| 2017/0309174 | A1 | * | 10/2017 | Gonzales | G08G 1/09 |
| 2018/0075747 | A1 | * | 3/2018 | Pahwa | B60W 40/09 |
| 2018/0082203 | A1 | * | 3/2018 | Bender | G01C 21/3664 |

(Continued)

Primary Examiner — Zhen Y Wu

(57) ABSTRACT

A forward facing camera module is configured to, based on an image including a predetermined field of view (FOV) in front of the vehicle: determine a first distance between the vehicle and a first cyclist. A blind zone radar sensor module is configured to: determine a second distance between the vehicle and a second cyclist within a predetermined area on a side of the vehicle based on radar signals transmitted within the predetermined area. A first and second distance modules are configured to generate first and second signals when the first and second distances are decreasing, respectively. An output control module is configured to, when at least one of the first signal and the second signal is generated while a turn light for the side of the vehicle is activated, selectively generate at least one of an audible output and a visual output within a passenger compartment of the vehicle.

20 Claims, 6 Drawing Sheets

(56) References Cited

U.S. PATENT DOCUMENTS

| | | |
|---|---|---|
| 2018/0105107 A1* | 4/2018 | Hassan-Shafique ... B60Q 9/008 |
| 2018/0157267 A1* | 6/2018 | Gao ..................... B60K 35/00 |
| 2018/0194346 A1* | 7/2018 | Gesch .................. B60W 30/09 |
| 2018/0233048 A1* | 8/2018 | Andersson ......... G06K 9/00805 |
| 2018/0257642 A1* | 9/2018 | Sherony ............... B60W 30/08 |
| 2018/0330526 A1* | 11/2018 | Corcoran ............... G06T 11/60 |
| 2019/0080313 A1* | 3/2019 | Van Wiemeersch ........................ H04W 4/023 |

* cited by examiner

DRIVER ALERT SYSTEMS AND METHODS BASED ON THE PRESENCE OF CYCLISTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to driver alert systems and methods of vehicles and more to systems and methods for systems and methods for alerting drivers of the presence of cyclists within vehicle blind spots during turning.

Vehicles include one or more torque producing devices, such as an internal combustion engine and/or an electric motor. A passenger of a vehicle rides within a passenger cabin (or passenger compartment) of the vehicle.

An infotainment system of a vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

SUMMARY

In a feature, a driver alert system of a vehicle is described. The driver alert system includes at least one of: a forward facing camera module configured to, based on an image including a predetermined field of view (FOV) in front of the vehicle: identify the presence of a first cyclist; and determine a first distance between the vehicle and the first cyclist; and a blind zone radar sensor module configured to: identify the presence of a second cyclist within a predetermined area on a side of the vehicle based on radar signals transmitted within the predetermined area; and determine a second distance between the vehicle and the second cyclist. The driver alert system includes at least one of: a first distance module configured to generate a first signal when the first distance is decreasing; and a second distance module configured to generate a second signal when the second distance is decreasing. An output control module is configured to, when at least one of the first signal and the second signal is generated while a turn light for the side of the vehicle is activated, selectively generate at least one of an audible output and a visual output within a passenger compartment of the vehicle.

In further features, the driver alert system includes: both the forward facing camera module and the blind zone radar sensor module; and both the first distance module and the second distance module.

In further features, the output control module is further configured to illuminate a blind zone light for the side of the vehicle when the second cyclist is present within the predetermined area on the side of the vehicle.

In further features, the output control module is configured to not generate the at least one of the audible output and the visual output within the passenger compartment of the vehicle when the first cyclist is within the predetermined FOV in front of the vehicle.

In further features, the predetermined FOV and the predetermined area do not overlap.

In further features: the forward facing camera module is configured to determine a location of the first cyclist; and the output control module is configured to selectively generate the at least one of the audible output and the visual output further based on the location of the first cyclist.

In further features, the output control module is configured to generate the at least one of the audible output and the visual output when: the first signal is generated, the turn light for the side of the vehicle is activated, and the location of the first cyclist is within a predetermined area between the predetermined FOV and the predetermined area.

In further features, the output control module is configured to generate the at least one of the audible output and the visual output when: the first signal is generated, the turn light for the side of the vehicle is activated, and the location of the first cyclist is within a predetermined portion of an area defined by between boundaries of the predetermined FOV and the predetermined area.

In further features: a period module is configured to estimate a period until the location of the first cyclist is within a predetermined portion of an area defined by between boundaries of the predetermined FOV and the predetermined area, and the output control module is configured to generate the at least one of the audible output and the visual output when, for the period: the first signal is generated, the turn light for the side of the vehicle is activated, the first cyclist is not a identified within the predetermined FOV in front of the vehicle, and the first cyclist is not identified within the predetermined area on the side of the vehicle.

In further features, the output control module is configured to at least one of: generate the audible output via at least one speaker within the passenger compartment of the vehicle; and generate the visual output via at least one light within the passenger compartment of the vehicle.

In a feature, a driver alert method for a vehicle includes: at least one of: based on an image including a predetermined field of view (FOV) in front of the vehicle: identifying the presence of a first cyclist; and determining a first distance between the vehicle and the first cyclist; and based on radar signals transmitted within a predetermined area on a side of the vehicle: identifying the presence of a second cyclist within the predetermined area; and determining a second distance between the vehicle and the second cyclist; at least one of: generating a first signal when the first distance is decreasing; and generating a second signal when the second distance is decreasing; and when at least one of the first signal and the second signal is generated while a turn light for the side of the vehicle is activated, selectively generating at least one of an audible output and a visual output within a passenger compartment of the vehicle.

In further features, the method includes both: based on the image including a predetermined FOV in front of the vehicle: identifying the presence of the first cyclist; and determining the first distance between the vehicle and the first cyclist; and based on the radar signals transmitted within the predetermined area: identifying the presence of the second cyclist within the predetermined area on the side of the vehicle; and determining the second distance between the vehicle and the second cyclist; and both: generating the first signal when the first distance is decreasing; and generating the second signal when the second distance is decreasing.

In further features, the method further includes illuminating a blind zone light for the side of the vehicle when the second cyclist is present within the predetermined area on the side of the vehicle.

In further features, the method further includes not generating the at least one of the audible output and the visual output within the passenger compartment of the vehicle when the first cyclist is within the predetermined FOV in front of the vehicle.

In further features, the predetermined FOV and the predetermined area do not overlap.

In further features, the method further includes: determining a location of the first cyclist; and selectively generating the at least one of the audible output and the visual output further based on the location of the first cyclist.

In further features, the method further includes generating the at least one of the audible output and the visual output when: the first signal is generated, the turn light for the side of the vehicle is activated, and the location of the first cyclist is within a predetermined area between the predetermined FOV and the predetermined area.

In further features, the method further includes generating the at least one of the audible output and the visual output when: the first signal is generated, the turn light for the side of the vehicle is activated, and the location of the first cyclist is within a predetermined portion of an area defined by between boundaries of the predetermined FOV and the predetermined area.

In further features, the method further includes: estimating a period until the location of the first cyclist is within a predetermined portion of an area defined by between boundaries of the predetermined FOV and the predetermined area; and generating the at least one of the audible output and the visual output when, for the period: the first signal is generated, the turn light for the side of the vehicle is activated, the first cyclist is not a identified within the predetermined FOV in front of the vehicle, and the first cyclist is not identified within the predetermined area on the side of the vehicle.

In further features, the method further includes at least one of: generating the audible output via at least one speaker within the passenger compartment of the vehicle; and generating the visual output via at least one light within the passenger compartment of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a forward facing camera module that captures images within a predetermined field of view (FOV) in front of a vehicle. Based on the images, the forward facing camera module identifies and determines locations of objects located within the predetermined FOV in front of the vehicle. For example, based on the images, the forward facing camera module identifies and determines locations of vehicles, pedestrians, cyclists, and other objects. The forward facing camera module also determines the locations of objects beside the vehicle once the objects have left the predetermined FOV in front of the vehicle.

The vehicle also includes side blind zone radar sensor modules that identify objects within predetermined blind zone areas beside the vehicle using radar. A control module may illuminate a side blind zone light located at a side of the vehicle when a side blind zone radar sensor module identifies a vehicle within the predetermined blind zone area on that side of the vehicle.

According to the present disclosure, an output control module selectively generates an audible and/or visual output to alert the driver to the presence of a cyclist within a side blind spot of the vehicle based on information from the forward facing camera module and/or a side blind zone radar sensor module. For example, the output control module may generate the audible and/or visual output when the forward facing camera module determines that a cyclist is within a predetermined area between the predetermined FOV in front of the vehicle and the predetermined blind zone area on that side of the vehicle and the driver has activated turn lights on that side of the vehicle. This may occur, for example, when the vehicle passes (at least partially) the cyclist in an attempt to turn in front of the cyclist.

The output control module may additionally or alternatively generate the audible and/or visual output when a side blind zone radar sensor module determines that a cyclist is present within the predetermined area beside the vehicle and the driver has activated turn lights on that side of the vehicle. This may occur, for example, when the cyclist approaches the vehicle from behind while the vehicle is preparing to turn or turning.

Figure 1:
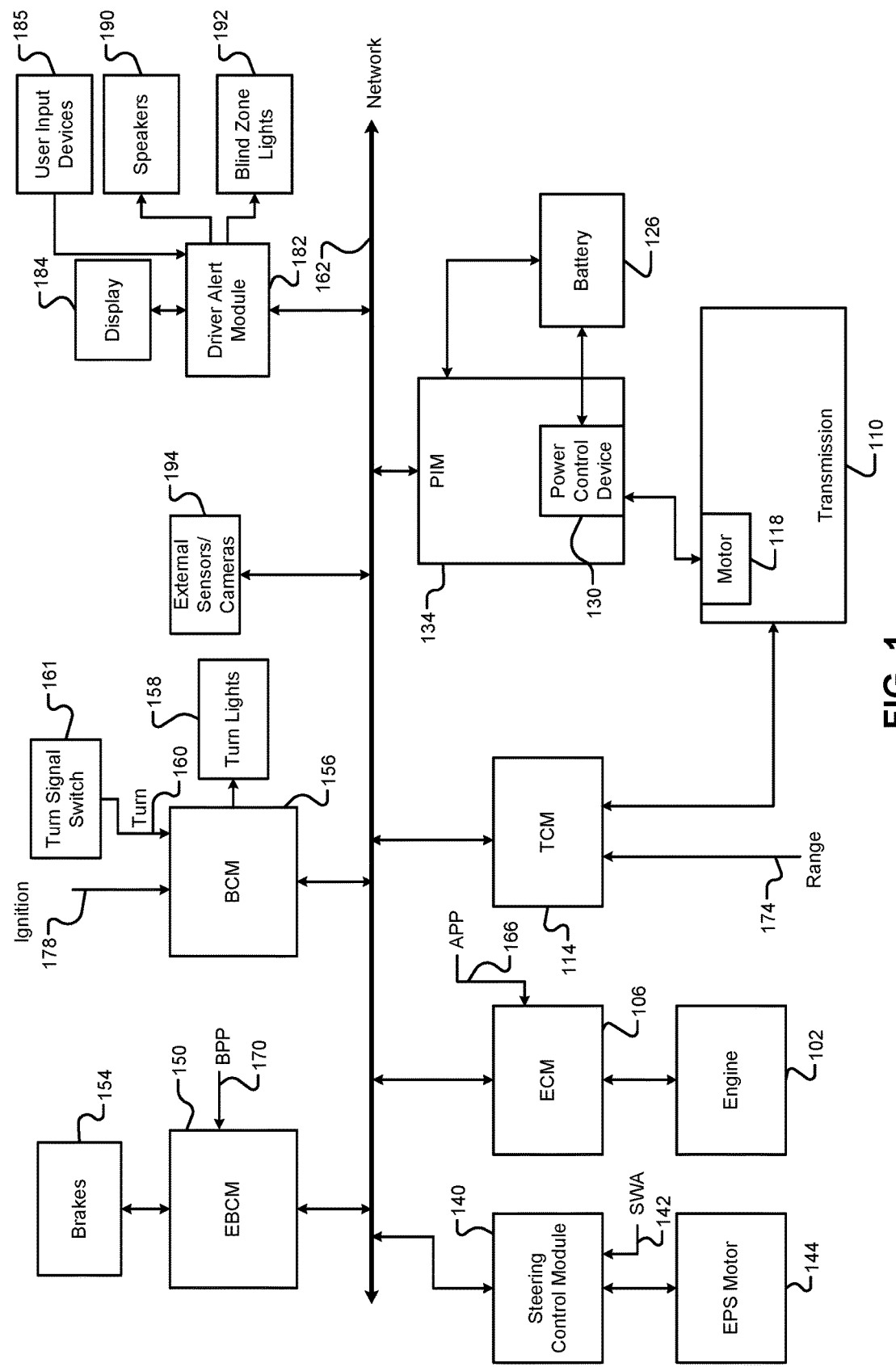
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 combusts an air/fuel mixture to generate drive torque. An engine control module (ECM) 106 controls the engine 102 based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. A body control module (BCM) 156 may control various devices of the vehicle. For example, the BCM 156 may control left and right turn lights, which are collectively illustrated in FIG. 1 by turn lights 158. The BCM 156 may control the turn lights 158 based on a turn signal 160 from a turn signal switch 161. For example, the BCM 156 may turn right side turn lights of the vehicle on and off at a predetermined rate when the turn signal 160 is in a first state. The BCM 156 may turn the left side turn lights of the vehicle on and off at the predetermined rate when the turn signal 160 is in a second state. The BCM 156 may maintain the left and right side turn lights off when the turn signal 160 is in a third state. The turn signal switch 161 may set the turn signal 160 to one of the first state, the second state, and the third state at a given time, for example, based on actuation of a turn signal lever.

Modules of the vehicle may share parameters via a network 162, such as a controller area network (CAN). The CAN may also be referred to as a car area network. For example, the network 162 may include one or more data buses. Various parameters may be made available by a given control module to other control modules via the network 162.

The driver inputs may include, for example, an accelerator pedal position (APP) 166 measured by an APP sensor, which may be provided to the ECM 106. A brake pedal position (BPP) 170 may be measured by a BPP sensor and provided to the EBCM 150. A range selection 174 may be provided to the TCM 114 by a transmission range selector, such as a park, reverse, neutral, drive range selector. An ignition signal 178 may be provided to the BCM 156. For example, the ignition signal 178 may be received via an ignition key, button, or switch. At a given time, the ignition signal 178 may be one of off, accessory, run, or crank. The BCM 156 may start the engine 102 when the ignition signal 178 transitions from off to crank.

The vehicle system also includes a driver alert module 182. The driver alert module 182 selectively outputs alerts to a driver of the vehicle when cyclists are present within side blind zones of the vehicle. A cyclist includes one or more individuals riding a bicycle or tricycle. For example, the driver alert module 182 may selectively display a visual alert to the presence of a cyclist within a right side blind zone of the vehicle on a display 184 when the turn signal 160 is in the first state indicating that a turn to the right may occur. The display 184 may be a touchscreen display in various implementations and transmit signals indicative of user input to the display 184 to the driver alert module 182. The driver alert module 182 may additionally or alternatively receive signals indicative of user input from one or more other user input devices 185, such as one or more switches, buttons, knobs, etc.

The driver alert module 182 may additionally or alternatively output alerts via one or more other devices. For example, the driver alert module 182 may output sound via one or more speakers 190 of the vehicle. The driver alert module 182 may also selectively illuminate right and left side blind zone lights, collectively illustrated in FIG. 1 by side blind zone lights 192. The right side blind zone light may be implemented in the housing of a right side rear view mirror or at another suitable location. The left side blind zone light may be implemented in the housing of a left side rear view mirror or at another suitable location.

The vehicle may include one or more additional control modules that are not shown, such as a chassis control module, a battery pack control module, etc. The vehicle may omit one or more of the control modules shown and discussed.

Figure 2:
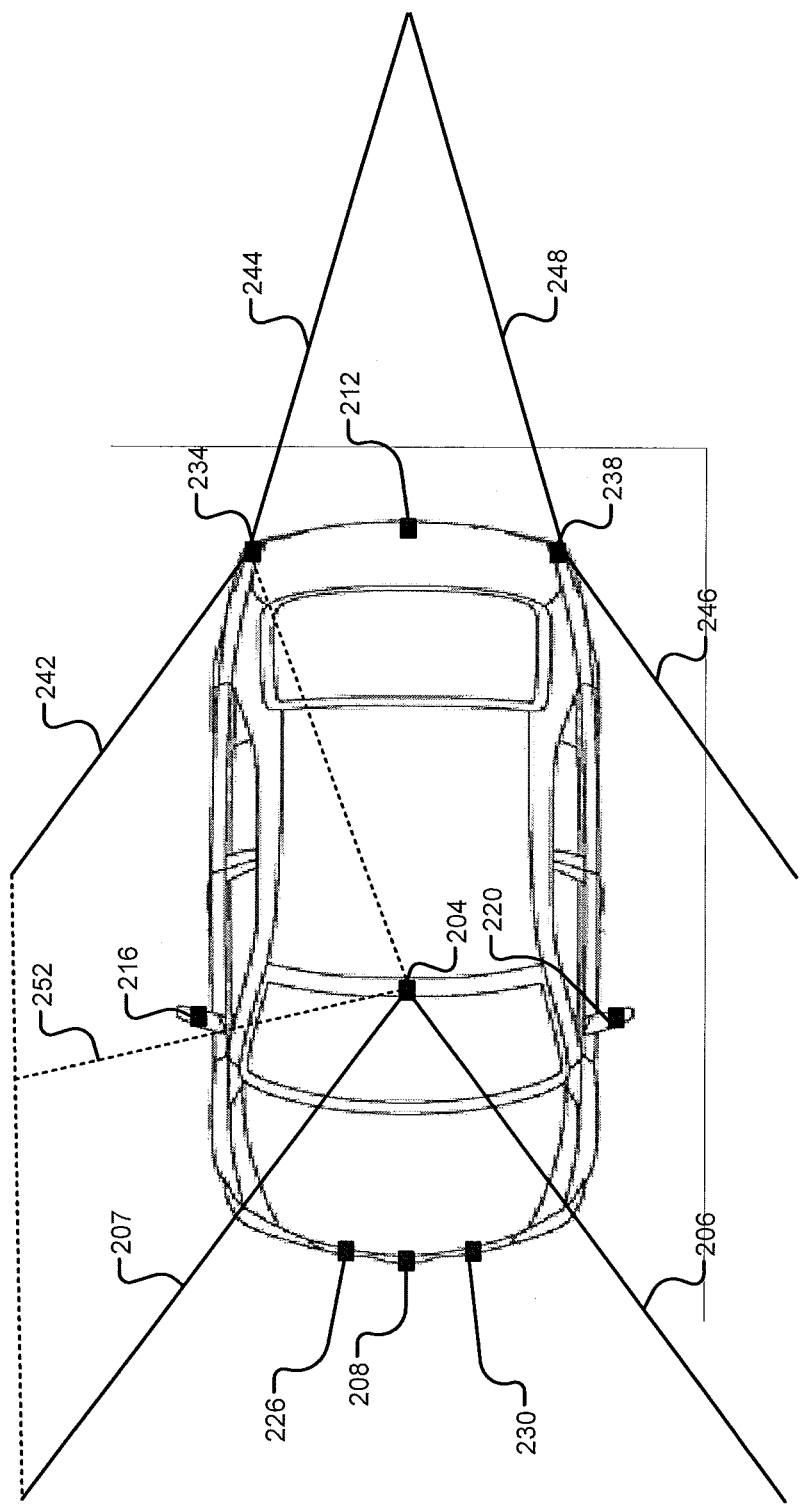
FIG. 2 is a functional block diagram of an example vehicle including examples of external sensor and camera modules.

The driver alert module 182 outputs the alerts based on input from various external sensor modules and camera modules, generally illustrated in FIG. 1 by 194. Referring now to FIG. 2, a functional block diagram of a vehicle including examples of external sensor and camera modules is presented.

The external sensor and camera modules 194 include various camera modules positioned to capture images and video outside of (external to) the vehicle and various types of sensor modules measuring parameters outside of (external to) the vehicle. For example, a forward facing camera module 204 captures images and video of images within a predetermined field of view (FOV) in front of the vehicle, for example, defined by boundaries 206 and 207.

A front camera module 208 may also capture images and video within a predetermined FOV in front of the vehicle. The front camera module 208 may capture images and video within a predetermined distance of the front of the vehicle and may be located at the front of the vehicle (e.g., in a front fascia, grille, or bumper). The forward facing camera module 204 may be located more rearward, such as with a rear view mirror within a windshield of the vehicle. The forward facing camera module 204 may not be able to capture images and video of items within all of or at least a portion of the predetermined FOV of the front camera module 208 and may capture images and video that is greater than the predetermined distance of the front of the vehicle.

A rear camera module 212 captures images and video within a predetermined FOV behind the vehicle. The rear camera module 212 may capture images and video within a predetermined distance behind vehicle and may be located at the rear of the vehicle, such as near a rear license plate. A right camera module 216 captures images and video within a predetermined FOV to the right of the vehicle. The right camera module 216 may capture images and video within a predetermined distance to the right of the vehicle and may be located, for example, under the right side rear view mirror. In various implementations, the right side rear view mirror may be omitted, and the right camera module 216 may be located near where the right side rear view mirror would normally be located.

A left camera module 220 captures images and video within a predetermined FOV to the left of the vehicle. The left camera module 220 may capture images and video within a predetermined distance to the left of the vehicle and may be located, for example, under the left side rear view mirror. In various implementations, the left side rear view mirror may be omitted, and the left camera module 220 may be located near where the left side rear view mirror would normally be located.

The external sensors and camera modules 194 also include various other types of sensors, such as radar sensor modules (e.g., ultrasonic radar sensor modules). For example, the vehicle may include one or more forward facing radar sensor modules, such as forward facing ultrasonic sensor modules 226 and 230. The vehicle also includes one or more side blind zone radar sensor modules, such as right blind zone radar sensor module 234 and left blind zone radar sensor module 238. The vehicle may also include one or more other radar sensor modules and/or other types of sensor modules (e.g., LIDAR, etc.). The locations of the camera modules and the radar sensor modules are provided as examples only and different locations could be used.

Radar sensor modules transmit radar signals within a predetermined FOV and identify objects within the predetermined FOV based on signals reflected back by objects within the predetermined FOV. For example, the right blind zone radar sensor module 234 transmits radar signals within a predetermined right blind zone FOV, for example, defined by boundaries 242 and 244. The right blind zone radar sensor module 234 identifies objects (e.g., cyclists, vehicles, pedestrians, etc.) within the predetermined right blind zone FOV based on signals reflected back by objects within the predetermined right blind zone FOV.

The left blind zone radar sensor module 238 transmits radar signals within a predetermined left blind zone FOV, for example, defined by boundaries 246 and 248. The left blind zone radar sensor module 238 identifies objects (e.g., cyclists, vehicles, pedestrians, etc.) within the predetermined left blind zone FOV based on signals reflected back by objects within the predetermined left blind zone FOV.

The predetermined FOV of the forward facing camera module 204 and the predetermined right blind zone FOV of the right blind zone radar sensor module 234, however, do not overlap. In other words, there is an area between the predetermined FOV of the forward facing camera module 204 and the predetermined right blind zone FOV that are not imaged or sensed by either of the forward facing camera module 204 and the right blind zone radar sensor module 234. For example, the forward facing camera module 204 may not capture objects and the right blind zone radar sensor module 234 may not identify objects presently located within the area between the boundary 207 and the boundary 242. The same is true for objects located between the predetermined FOV of the forward facing camera module 204 and the predetermined left blind zone FOV of the left blind zone radar sensor module 238.

When the vehicle is traveling forward, however, the presence of an object within the area between the boundaries 207 and 242 can be determined by the forward facing camera module 204 based on the object leaving the predetermined FOV of the forward facing camera module 204 via the boundary 207. In other words, the forward facing camera module 204 determines a location of an object within the area between the boundaries 207 and 242 based on the speed of the vehicle in the forward direction and the speed of the object in the forward direction.

A predetermined portion of the area between the boundaries 207 and 242, however, may not be visible to a driver of the vehicle unless the driver turns his or her view to the right by at least a predetermined amount. One or more components of the vehicle may additionally or alternatively obstruct view of one or more portions of the predetermined portion of the area between the boundaries 207 and 242. An example of the predetermined portion of the area is illustrated between boundary 252 and the boundary 242. The predetermined portion of the area will be referred to as a relevant area.

One type of object identified by the forward facing camera module 204 and the right blind zone radar sensor module 234 is cyclists on bicycles. According to the present disclosure, the driver alert module 182 selectively generates one or more predetermined audio and/or visual outputs indicative of the presence of a cyclist when a cyclist is present within the relevant area or within the predetermined right blind zone FOV when the driver will make a right turn of the vehicle. The predetermined audio and/or visual output may alert the driver to the presence of the cyclist, for example, to allow the driver to avoid the cyclist.

Figure 3:
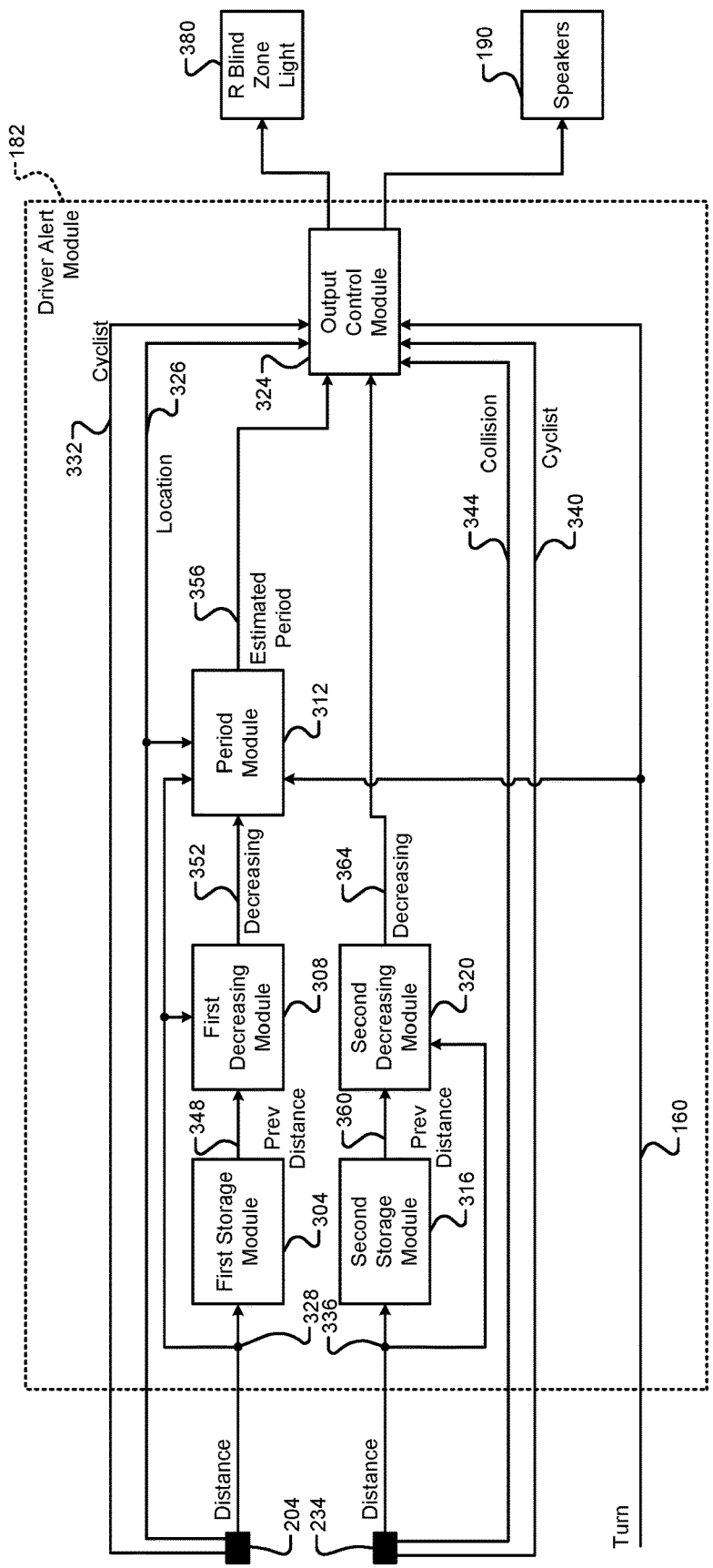
FIG. 3 is a functional block diagram of an example driver alert module.

FIG. 3 is a functional block diagram of an example implementation of the driver alert module 182. The driver alert module 182 includes a first storage module 304, a first decreasing module 308, and a period module 312. The driver alert module 182 also includes a second storage module 316, a second decreasing module 320, and an output control module 324.

The forward facing camera module 204 captures images within the predetermined FOV in front of the vehicle at a predetermined rate (e.g., each predetermined period). Using object identification, the forward facing camera module 204 identifies whether one or more predetermined objects are present within each image. For example, the forward facing camera module 204 determines whether a cyclist is present within an image based on whether the image includes a shape that matches a predetermined shape of a cyclist on a bicycle to at least a predetermined extent. One or more predetermined shapes for cyclists on bicycles are stored in memory for the matching and the determination.

When a cyclist is identified, the forward facing camera module 204 determines a location 326 of the cyclist (e.g., coordinates relative to the forward facing camera module 204) and a distance 328 to the cyclist (e.g. from the forward facing camera module 204). The location 326 may be within the predetermined FOV of the forward facing camera module 204 when the cyclist is within a present image captured by the forward facing camera module 204. The location 326 may be within the area between the boundaries 207 and 242 for a predetermined period (e.g., based on vehicle speed and a speed of the cyclist) after the cyclist exits the predetermined FOV of the forward facing camera module 204 and before the cyclist is detected within the predetermined FOV of the rear blind zone radar sensor module 234. The cyclist may be determined to be within the relevant area (e.g., by the output control module 324) when the location 326 is between predetermined coordinates defining boundaries of the relevant area. The forward facing camera module 204 may determine the distance 328, for example, based on the location 326 of the cyclist and a predetermined location (coordinates) of the forward facing camera module 204.

When a cyclist is present within the predetermined FOV of the forward facing camera module 204 or within the area between the boundaries 207 and 242, the forward facing camera module 204 sets a cyclist signal 332 to a first state. When no cyclists are present within the predetermined FOV of the forward facing camera module 204 and no cyclists are present within the area between the boundaries 207 and 242, the forward facing camera module 204 sets the cyclist signal 332 to a second state. The forward facing camera module 204 updates the location 326 and the distance 328 for each image when a cyclist is present. While the forward facing camera module 204 is described as determining the location 326, the distance 328, and whether a cyclist is present, the forward facing camera module 204 may capture images and the driver alert module 182 (or another module) may determine the location 326, the distance 328, and/or whether a cyclist is present.

The right blind zone radar sensor module 234 transmits radar signals to within the predetermined right blind zone FOV and receives signals reflected by objects within the predetermined right blind zone FOV at a predetermined rate (e.g., each predetermined period). Using an object identification algorithm, the right blind zone radar sensor module 234 identifies whether one or more predetermined objects are present within the predetermined right blind zone FOV. For example, the right blind zone radar sensor module 234 determines whether a cyclist is present within the predetermined right blind zone FOV based on whether the received signals includes a shape that matches a predetermined shape of a cyclist on a bicycle to at least a predetermined extent. Signal characteristics for one or more predetermined shapes for cyclists on bicycles are stored in memory for the matching and the determination.

When a cyclist is identified, the right blind zone radar sensor module 234 determines a location of the cyclist (e.g., coordinates relative to the right blind zone radar sensor module 234) and a distance 336 to the cyclist (e.g. from the right blind zone radar sensor module 234). The forward facing camera module 204 may determine the distance 336, for example, based on the location of the cyclist within the predetermined right blind zone FOV and a predetermined location (coordinates) of the right blind zone radar sensor module 234.

When a cyclist is present within the predetermined right blind zone FOV, the right blind zone radar sensor module 234 sets a cyclist signal 340 to a first state. When no cyclists are present within the predetermined right blind zone FOV, the right blind zone radar sensor module 234 sets the cyclist signal 340 to a second state. The right blind zone radar sensor module 234 updates the location and the distance 336 each predetermined period when a cyclist is present.

The right blind zone radar sensor module 234 also determines a trajectory of the cyclist when the cyclist is present, for example, based on a change between instances of the location. The right blind zone radar sensor module 234 determines whether the cyclist's trajectory puts the cyclist on a course to collide with the vehicle based on the trajectory of the cyclist. The right blind zone radar sensor module 234 sets a collision signal 344 to a first state when the cyclist's trajectory puts the cyclist on course to collide with the vehicle. The right blind zone radar sensor module 234 sets the collision signal 344 to a second state when the cyclist's trajectory puts the cyclist on course to not collide with the vehicle. While the right blind zone radar sensor module 234 is described as determining the distance 336, whether a cyclist is present, the trajectory of the cyclist, and whether the cyclist is on course to collide with the vehicle, the driver alert module 182 (or another module) may determine the distance 336, whether a cyclist is present, the trajectory of the cyclist, and/or whether the cyclist is on course to collide with the vehicle.

The first storage module 304 receives the distance 328 to the cyclist and stores the distance 328. When the distance 328 is received, the first storage module 304 also outputs a previous (e.g., last) received instance of the distance 328 as a previous distance 348. The first storage module 304 may include, for example, a one unit first-in, first-out (FIFO) buffer.

The first decreasing module 308 compares the distance 328 to the cyclist with the previous distance 348 and determines whether the distance to the cyclist is decreasing. The first decreasing module 308 indicates whether the distance to the cyclist is decreasing. For example, the first decreasing module 308 may set a first decreasing signal 352 to a first state when the distance 328 is less than the previous distance 348. The first decreasing module 308 may set the first decreasing signal 352 to a second state when the distance 328 is greater than or equal to the previous distance 348.

A speed difference between a speed of the cyclist and a speed of the vehicle may also be determined (e.g., by a speed module) based on a difference between the distance 328 to the cyclist and the previous distance 348 over the period between the determination of the distance 328 and the determination of the distance that is then used as the previous distance 348.

When the distance to the cyclist is decreasing (e.g., when the first decreasing signal 352 is in the first state), the period module 312 determines an estimated period 356 until the cyclist is located in the relevant area. The period module 312 may determine the estimated period 356, for example, based on the speed difference divided by a distance between the location 326 of the cyclist and the location of a point of a boundary of the relevant area.

The second storage module 316 receives the distance 336 to the cyclist and stores the distance 336. When the distance 336 is received, the second storage module 316 also outputs a previous (e.g., last) received instance of the distance 336 as a previous distance 360. The second storage module 316 may include, for example, a one unit FIFO buffer.

The second decreasing module 320 compares the distance 336 to the cyclist with the previous distance 360 and determines whether the distance to the cyclist is decreasing. The second decreasing module 320 indicates whether the distance to the cyclist is decreasing. For example, the second decreasing module 320 may set a second decreasing signal 364 to a first state when the distance 336 is less than the previous distance 360. The second decreasing module 320 may set the second decreasing signal 364 to a second state when the distance 336 is greater than or equal to the previous distance 360.

Figure 4A:
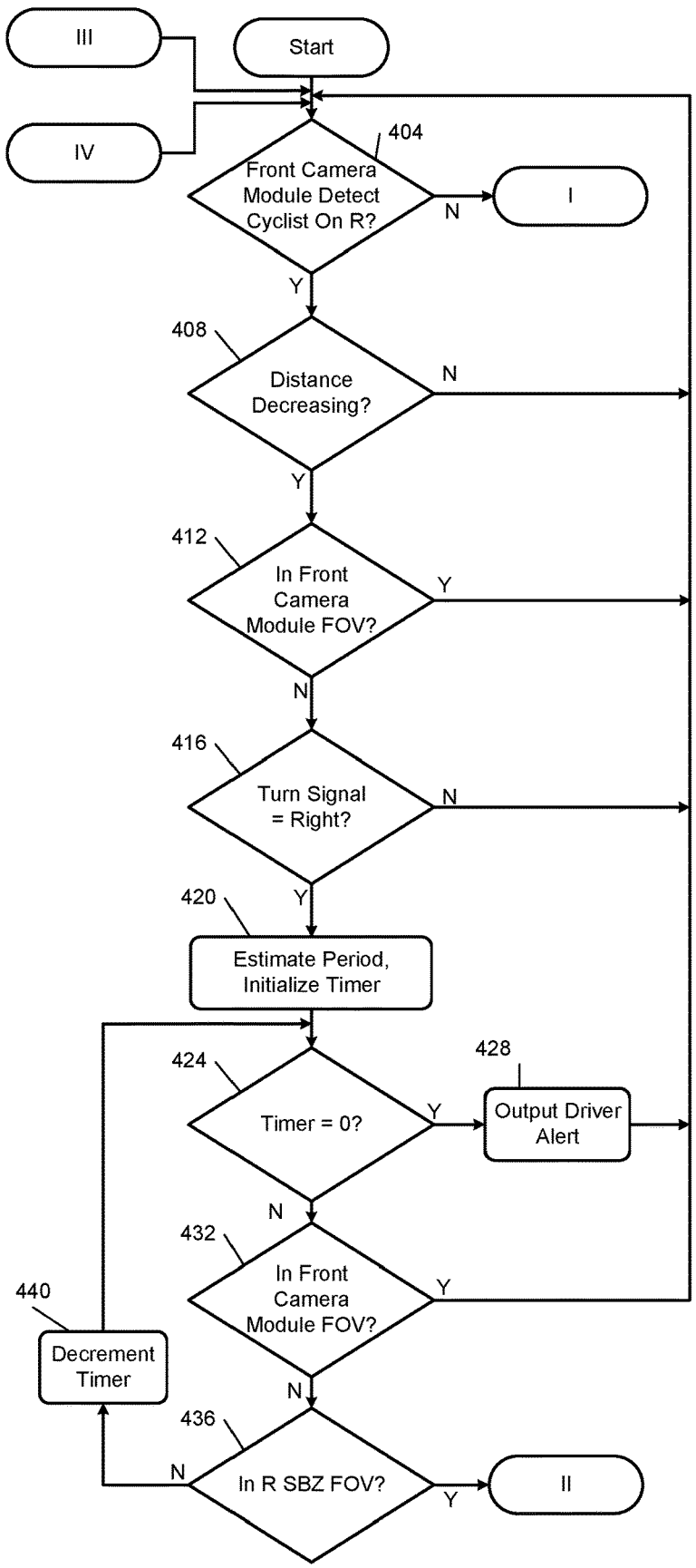
FIGS. 4A-4B include a flowchart depicting an example method of generating alerts based on the presence of a cyclist.
Figure 4B:
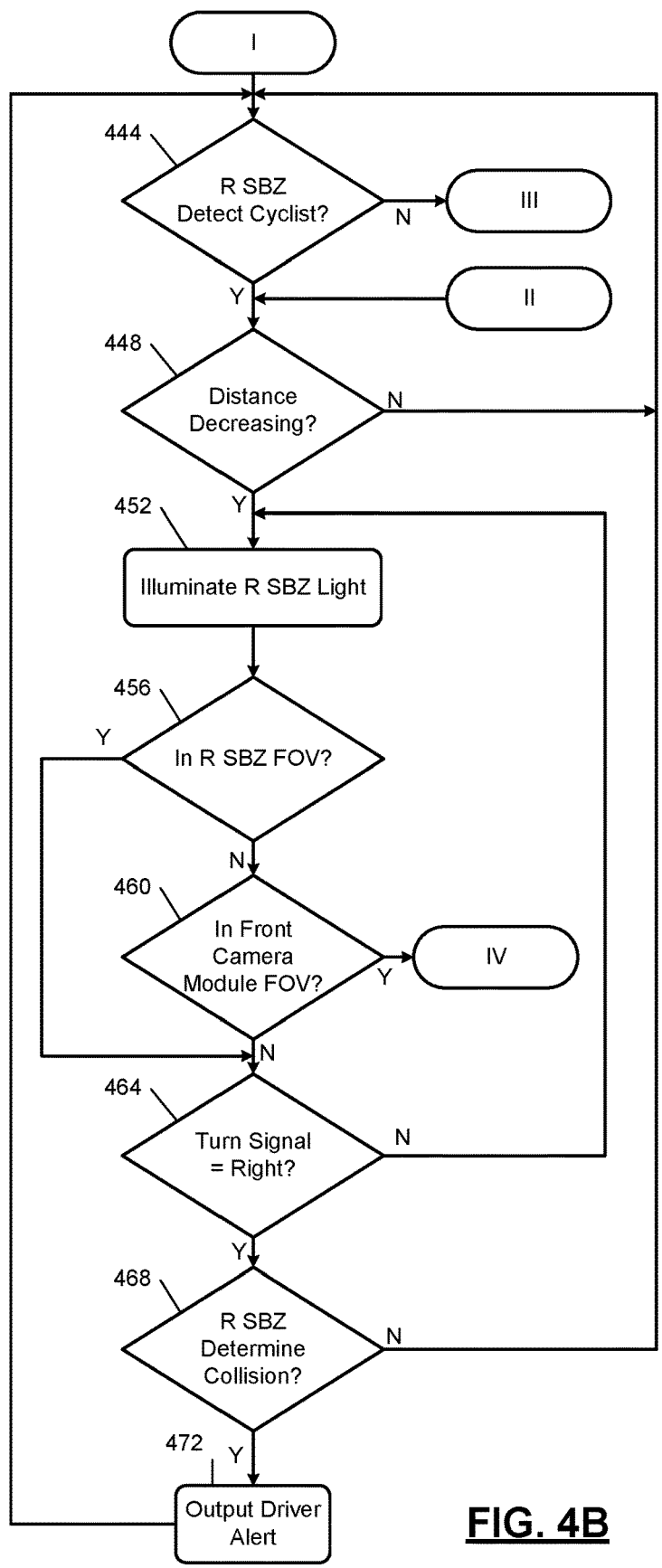

As discussed further below, the output control module 324 selectively outputs alerts to alert the driver to the presence of a cyclist to the right of the vehicle. FIGS. 4A-4B include a flowchart depicting an example method of generating alerts regarding the presence of a cyclist to the right of a vehicle. Control begins when the vehicle is on.

At 404, the forward facing camera module 204 captures an image of the predetermined FOV in front of the vehicle and determines whether a cyclist is located within the predetermined front FOV or within the area between the boundaries 207 and 242. If 404 is false, the forward facing camera module 204 sets the cyclist signal 332 to the second state and control transfers to 444 (FIG. 4B), which is discussed further below. If 404 is true, the forward facing camera module 204 sets the cyclist signal 332 to the first state, determines the distance 328 to the cyclist, and the location 326 of the cyclist, and control continues with 408.

At 408, the first storage module 304 stores the distance 328 and outputs a previous (e.g., last) stored instance of the distance 328 as the previous distance 348, and the first decreasing module 308 determines whether the distance 328 is less than the previous distance 348. If 408 is true, the first decreasing module 308 sets the first decreasing signal 352 to the first state, and control continues with 412. If 408 is false, control may return to 404.

The output control module 324 determines whether the cyclist is located in the predetermined FOV of the forward facing camera module 204 at 412. If 412 is true, control may return to 404. If 412 is false, control continues with 416. At 416, the output control module 324 determines whether the turn signal 160 is in the first state. In other words, the output control module 324 may determine whether the right side turn lights of the vehicle are being turned on and off at 416. If 416 is true, control returns to 404. If 416 is true, the period module 312 determines the estimated period 356 until the cyclist will be in the relevant area at 420. The output control module 324 may also initialize a value of a timer to or based on the estimated period 356 at 420.

Figure 5B:
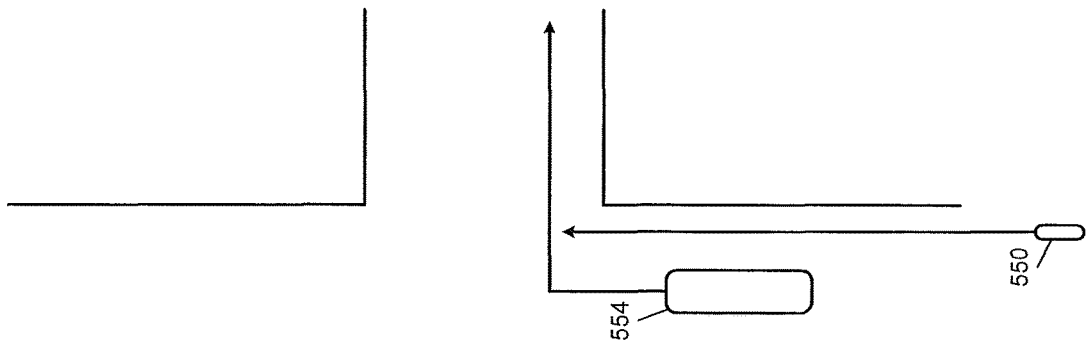
FIGS. 5A-5B include example top view illustrations of scenarios for generating alerts based on the presence of a cyclist.
Figure 5A:
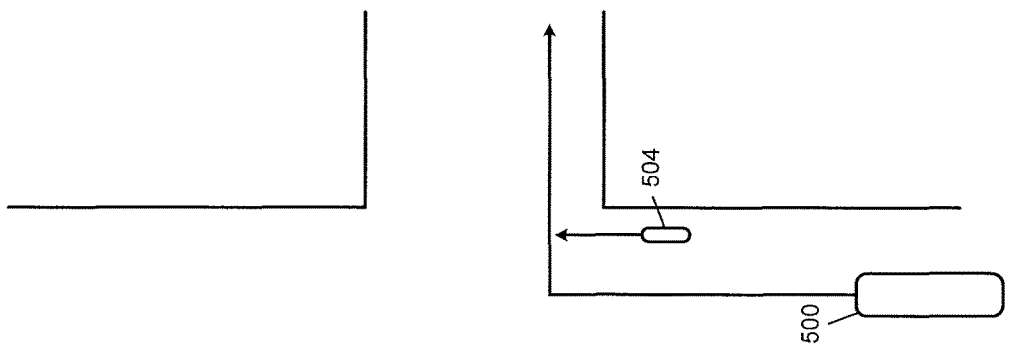

At 424, the output control module 324 may determine whether the timer value has reached zero. If 424 is true, at 428 the output control module 324 outputs an audible alert (e.g., a predetermined sound via the speakers 190) and/or a visual alert (e.g., illuminate one or more lights and/or display a predetermined message on the display 184) to alert the driver to the presence of a cyclist within the relevant area. Control may return to 404. If 424 is false, control continues with 432. The audible alert output at 428 alerts the driver in the situation where the vehicle passes the cyclist to turn right in front of the cyclist. FIG. 5A illustrates an example top view of a scenario where a vehicle 500 passes a cyclist 504 to turn right in front of the cyclist 504. In this scenario, an audible alert will be generated at 428.

At 432, the output control module 324 determines whether the cyclist is located in the predetermined FOV of the forward facing camera module 204. If 432 is true, the cyclist is not within the relevant area, and control may return to 404. If 432 is false, control may continue with 436.

The output control module 324 may determine whether the cyclist has been detected by the right blind zone radar sensor module 234 within the predetermined right blind zone FOV at 436. For example, the output control module 324 may determine whether the cyclist signal 340 is in the first state at 436. If 436 is true, control may transfer to 448, which is discussed further below. If 436 is false, the output control module 324 may decrement the timer value (e.g., by a predetermined decrement amount) at 440, and control may return to 424. While initializing the timer value based on the estimated period 356, decrementing the timer value, and determining whether the timer value has reached zero has been described, the present application is also applicable to initializing the timer value to zero, incrementing the timer value, and determining whether the timer value is greater than or equal to the estimated period 356.

Referring now to FIG. 4B, the output control module 324 may determine whether the cyclist has been detected by the right blind zone radar sensor module 234 within the predetermined right blind zone FOV at 444. For example, the output control module 324 may determine whether the cyclist signal 340 is in the first state at 444. If 444 is true, control continues with 448. If 444 is false, control may return to 404, as discussed above.

At 448, the second storage module 316 stores the distance 336 and outputs a previous (e.g., last) stored instance of the distance 336 as the previous distance 360, and the second decreasing module 320 determines whether the distance 336 is less than the previous distance 360. If 448 is true, the second decreasing module 320 sets the second decreasing signal 364 to the first state, and control continues with 452. If 448 is false, control may return to 444.

At 452, the output control module 324 illuminates the right side one of the side blind zone lights 192, right side blind zone light 380 (FIG. 3). As stated above, the right side blind zone light 380 may be implemented, for example, in the housing of a right side rear view mirror or at another suitable location.

At 456, the output control module 324 may determine whether the cyclist has been detected by the right blind zone radar sensor module 234 within the predetermined right blind zone FOV. For example, the output control module 324 may determine whether the cyclist signal 340 is in the first state at 456. If 456 is true, control transfers to 464, which is discussed further below. If 456 is false, control may continue with 460. Since the cyclist was previously detected at 444 and the distance to the cyclist was decreasing at 448, the cyclist could be within the relevant area and is in the area between the predetermined FOV of the forward facing camera module 204 and the predetermined right blind zone FOV when 456 is false.

At 460, the output control module 324 determines whether the cyclist is located in the predetermined FOV of the forward facing camera module 204. If 460 is true, the cyclist is not within the relevant area, and control may return to 404. If 460 is false, control may continue with 464.

The output control module 324 determines whether the turn signal 160 is in the first state at 464. In other words, the output control module 324 may determine whether the right side turn lights of the vehicle are being turned on and off at 464. If 464 is true, control continues with 468. If 464 is false, control may return to 452.

At 468, the output control module 324 may determine whether the right blind zone radar sensor module 234 has determined that the cyclist on course to collide with the vehicle. For example, the output control module 324 may determine whether the collision signal 344 is in the first state at 468. If 468 is false, control may return to 444. If 468 is true, the output control module 324 outputs an audible alert (e.g., a predetermined sound via the speakers 190) and/or a visual alert (e.g., illuminate one or more lights and/or display a predetermined message on the display 184) to alert the driver to the presence of a cyclist at 472. Control may then return to 444.

The audible alert output at 428 alerts the driver in the situation where the cyclist approaches the vehicle from behind. FIG. 5B illustrates an example top view of a scenario where a cyclist 550 approaches a vehicle 554 from behind (e.g., while the vehicle 554 is stopped at an intersection) before turning right. In this scenario, an audible alert will be generated at 472.

Above, the example of cyclists on the right of vehicles is described (e.g., where vehicles traveling in the opposite direction pass on the left and cyclists traveling in the same direction pass on the right, such as in the U.S.). However, the present application is equally applicable to cyclists to the left of the vehicle (e.g., where vehicles traveling in the opposite direction pass on the right and cyclists traveling in the same direction pass on the left, such as in Europe). In this case, use of the left turn light, the left blind zone radar sensor module, and the left side blind zone light would be used.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A driver alert system of a vehicle, comprising:
at least one of:
  a forward facing camera module configured to:
    based on an image including a predetermined field of view (FOV) in front of the vehicle, identify the presence of a first cyclist; and
    based on the image including the predetermined FOV in front of the vehicle, determine a first distance between the vehicle and the first cyclist; and
  a blind zone radar sensor module configured to:
    identify the presence of a second cyclist within a predetermined area on a side of the vehicle based on radar signals transmitted within the predetermined area; and
    determine a second distance between the vehicle and the second cyclist;
at least one of:
  a first distance module configured to generate a first signal when the first distance is decreasing; and
  a second distance module configured to generate a second signal when the second distance is decreasing; and
an output control module configured to, when at least one of the first signal and the second signal is generated while a turn light for the side of the vehicle is activated, selectively generate at least one of an audible output and a visual output within a passenger compartment of the vehicle.

2. The driver alert system of claim 1 wherein the driver alert system includes:
both the forward facing camera module and the blind zone radar sensor module; and
both the first distance module and the second distance module.

3. The driver alert system of claim 2 wherein the output control module is further configured to illuminate a blind zone light for the side of the vehicle when the second cyclist is present within the predetermined area on the side of the vehicle.

4. The driver alert system of claim 2 wherein the output control module is configured to not generate the at least one of the audible output and the visual output within the passenger compartment of the vehicle when the first cyclist is within the predetermined FOV in front of the vehicle.

5. The driver alert system of claim 2 wherein the predetermined FOV and the predetermined area do not overlap.

6. The driver alert system of claim 5 wherein:
the forward facing camera module is configured to determine a location of the first cyclist; and
the output control module is configured to selectively generate the at least one of the audible output and the visual output further based on the location of the first cyclist.

7. The driver alert system of claim 6 wherein the output control module is configured to generate the at least one of the audible output and the visual output when: the first signal is generated, the turn light for the side of the vehicle is activated, and the location of the first cyclist is within a second predetermined area between the predetermined FOV and the predetermined area.

8. The driver alert system of claim 6 wherein the output control module is configured to generate the at least one of the audible output and the visual output when: the first signal is generated, the turn light for the side of the vehicle is activated, and the location of the first cyclist is within a predetermined portion of an area defined by between boundaries of the predetermined FOV and the predetermined area.

9. The driver alert system of claim 6 further comprising:
a period module configured to estimate a period until the location of the first cyclist is within a predetermined portion of an area defined by between boundaries of the predetermined FOV and the predetermined area,
wherein the output control module is configured to generate the at least one of the audible output and the visual output when, for the period: the first signal is generated, the turn light for the side of the vehicle is activated, the first cyclist is not a identified within the predetermined FOV in front of the vehicle, and the first cyclist is not identified within the predetermined area on the side of the vehicle.

10. The driver alert system of claim 1 wherein the output control module is configured to at least one of:
generate the audible output via at least one speaker within the passenger compartment of the vehicle; and
generate the visual output via at least one light within the passenger compartment of the vehicle.

11. A driver alert method for a vehicle, comprising:
at least one of:
  based on an image including a predetermined field of view (FOV) in front of the vehicle:
    identifying the presence of a first cyclist; and
    determining a first distance between the vehicle and the first cyclist; and
  based on radar signals transmitted within a predetermined area on a side of the vehicle:
    identifying the presence of a second cyclist within the predetermined area; and
    determining a second distance between the vehicle and the second cyclist;
at least one of:
  generating a first signal when the first distance is decreasing; and
  generating a second signal when the second distance is decreasing; and
when at least one of the first signal and the second signal is generated while a turn light for the side of the vehicle is activated, selectively generating at least one of an audible output and a visual output within a passenger compartment of the vehicle.

12. The driver alert method of claim 11 wherein the method comprises:
both:
  based on the image including a predetermined FOV in front of the vehicle:
    identifying the presence of the first cyclist; and determining the first distance between the vehicle and the first cyclist; and based on the radar signals transmitted within the predetermined area:

identifying the presence of the second cyclist within the predetermined area on the side of the vehicle; and determining the second distance between the vehicle and the second cyclist; and both:

generating the first signal when the first distance is decreasing; and generating the second signal when the second distance is decreasing.

13. The driver alert method of claim 12 further comprising illuminating a blind zone light for the side of the vehicle when the second cyclist is present within the predetermined area on the side of the vehicle.

14. The driver alert method of claim 12 further comprising not generating the at least one of the audible output and the visual output within the passenger compartment of the vehicle when the first cyclist is within the predetermined FOV in front of the vehicle.

15. The driver alert method of claim 12 wherein the predetermined FOV and the predetermined area do not overlap.

16. The driver alert method of claim 15 further comprising:

determining a location of the first cyclist; and selectively generating the at least one of the audible output and the visual output further based on the location of the first cyclist.

17. The driver alert method of claim 16 further comprising generating the at least one of the audible output and the visual output when: the first signal is generated, the turn light for the side of the vehicle is activated, and the location of the first cyclist is within a second predetermined area between the predetermined FOV and the predetermined area.

18. The driver alert method of claim 16 further comprising generating the at least one of the audible output and the visual output when: the first signal is generated, the turn light for the side of the vehicle is activated, and the location of the first cyclist is within a predetermined portion of an area defined by between boundaries of the predetermined FOV and the predetermined area.

19. The driver alert method of claim 16 further comprising:

estimating a period until the location of the first cyclist is within a predetermined portion of an area defined by between boundaries of the predetermined FOV and the predetermined area; and generating the at least one of the audible output and the visual output when, for the period: the first signal is generated, the turn light for the side of the vehicle is activated, the first cyclist is not a identified within the predetermined FOV in front of the vehicle, and the first cyclist is not identified within the predetermined area on the side of the vehicle.

20. The driver alert method of claim 11 further comprising at least one of:

generating the audible output via at least one speaker within the passenger compartment of the vehicle; and generating the visual output via at least one light within the passenger compartment of the vehicle.

* * * * *